… …

United States Patent [19]

McMurtry

[11] Patent Number: 5,088,046
[45] Date of Patent: Feb. 11, 1992

[54] MOUNTING FOR SURFACE-SENSING STYLUS AND A METHOD OF USING SAID MOUNTING

[75] Inventor: David R. McMurtry, Wotton-Under-Edge, United Kingdom

[73] Assignee: Renishaw plc, Gloucestershire, United Kingdom

[21] Appl. No.: 391,542

[22] PCT Filed: Dec. 19, 1988

[86] PCT No.: PCT/GB88/01135
§ 371 Date: Jul. 28, 1989
§ 102(e) Date: Jul. 28, 1989

[87] PCT Pub. No.: WO89/05960
PCT Pub. Date: Jun. 29, 1989

[30] Foreign Application Priority Data

Dec. 19, 1987 [GB] United Kingdom ............... 8729638

[51] Int. Cl.⁵ .................. G06F 15/46; G01B 21/20
[52] U.S. Cl. .................. 364/474.03; 33/504;
364/551.02; 364/560; 364/474.37
[58] Field of Search ............. 364/474.02, 474.03,
364/474.37, 559, 560, 561, 551.02, 167.01; 33/1
N, 1 M, 503, 504, 505, 555, 784, 561, 556, 557, 558

[56] References Cited

U.S. PATENT DOCUMENTS

| | | | |
|---|---|---|---|
| 3,531,868 | 10/1970 | Stevenson | 33/503 |
| 3,727,119 | 4/1973 | Stanley et al. | 318/578 X |
| 3,771,230 | 11/1973 | Sartorio | 33/636 |
| 3,805,393 | 4/1974 | Lemelson | 33/555 |
| 3,824,893 | 7/1974 | Sartorio | 33/23.11 |
| 3,869,799 | 3/1975 | Neurer et al. | 33/561 |
| 4,084,323 | 4/1978 | McMurtry | 33/561 |
| 4,384,332 | 5/1983 | McMurtry | 364/474.37 |
| 4,477,973 | 10/1984 | Davies | 33/1 CC |
| 4,542,467 | 9/1985 | McMurtry | 364/474.37 |
| 4,636,960 | 1/1987 | McMurtry | 364/474.37 |
| 4,703,443 | 10/1987 | Moriyasu | 364/559 |
| 4,769,763 | 9/1988 | Trieb et al. | 364/559 |
| 4,888,877 | 12/1989 | Enderle et al. | 33/559 |
| 4,901,256 | 2/1990 | McMurtry | 364/474.37 X |

FOREIGN PATENT DOCUMENTS

| | | |
|---|---|---|
| 0317967 | 11/1988 | European Pat. Off. . |
| 3406045 | 8/1985 | Fed. Rep. of Germany . |
| 58-205801 | 11/1983 | Japan . |
| 1123344 | 8/1968 | United Kingdom . |
| 2004656 | 4/1979 | United Kingdom . |
| 2037436 | 7/1980 | United Kingdom . |
| 2094478 | 9/1982 | United Kingdom . |
| 2139357 | 10/1983 | United Kingdom . |
| 2144860 | 3/1985 | United Kingdom . |

*Primary Examiner*—Joseph Ruggiero
*Attorney, Agent, or Firm*—Oliff & Berridge

[57] ABSTRACT

A mounting comprises a base supporting a first rotary motor whose shaft has secured thereto a housing supporting a second rotary motor whose shaft has the stylus secured thereto. Each motor is operable optionally in a constant torque mode and a positioning mode and each motor has an angular position transducer. In use, the base is secured to the operating member of a coordinate measuring machine and the machine is driven through a path such that the free end of the stylus can maintain engagement with the surface of a workpiece under the force generated by one of the motors while that motor is in the constant torque mode. The profile of said surface is then determined as a function of the coordinate position of the operating member, the angular position and the length of the stylus.

9 Claims, 7 Drawing Sheets

MOUNTING FOR SURFACE-SENSING STYLUS AND A METHOD OF USING SAID MOUNTING

BACKGROUND OF THE INVENTION

This invention relates to a mounting for a surface-sensing stylus and to a machine for and a method of using the mounting for determining the profile of a workpiece. The scope of the invention is specified in the claims hereto.

SUMMARY OF THE INVENTION

The invention as claimed makes it possible to determine said profile in a coordinate positioning machine by means of a stylus which is moved over the profile in such a way that the engagement between the stylus and the profile is maintained continually during this movement and that the contact pressure between the stylus and the workpiece does not vary or does not vary excessively. Also, the invention makes it possible for the mounting to be of relatively simple construction, and for the stylus to follow relatively large excursions of said profile without sacrificing adaptability to a variety of operating conditions. The invention may be used for measuring the profile or for providing data for copying the profile in a profile-copying system.

BRIEF DESCRIPTION OF THE DRAWINGS

An example of apparatus according to this invention will now be described with reference to the accompanying drawings wherein.

DESCRIPTION OF THE PREFERRED EMBODIMENT

Figure 1:
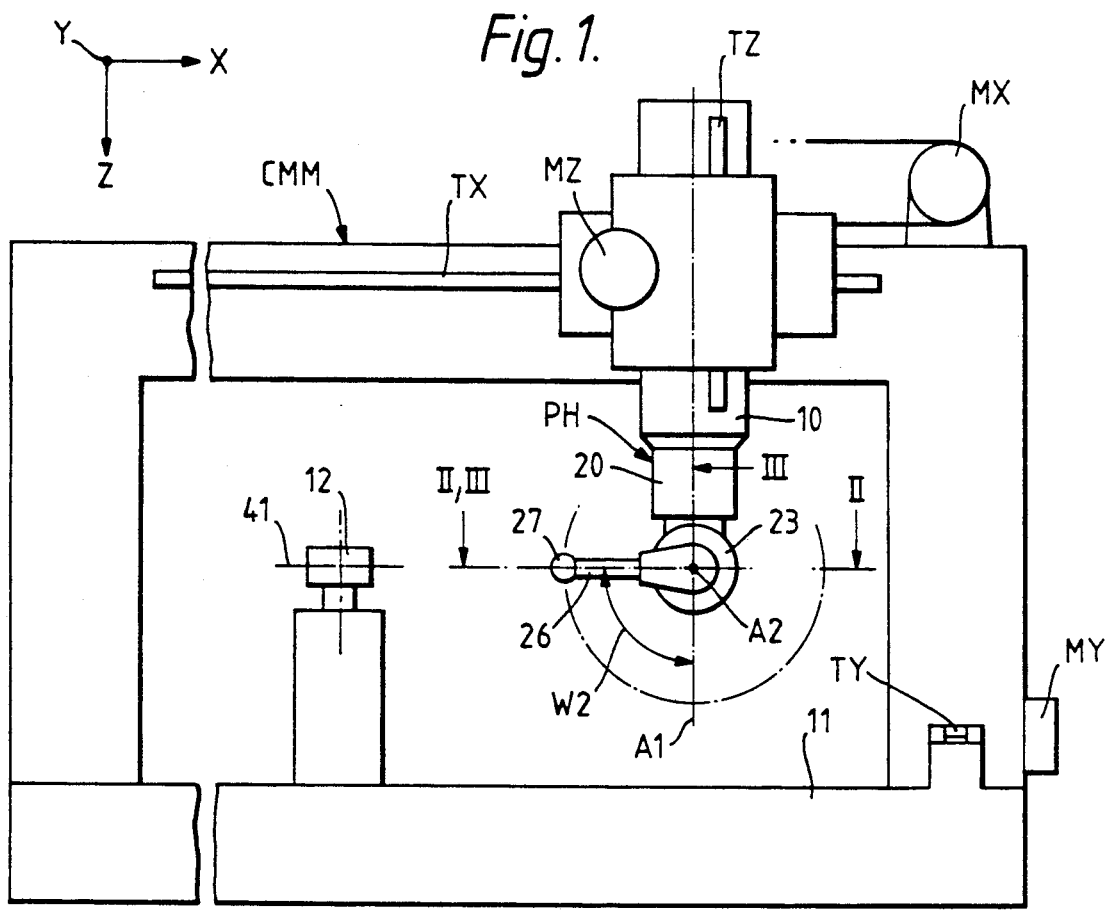
FIG. 1 is an elevation of a co-ordinate measuring machine including a stylus mounting.
Figure 2:
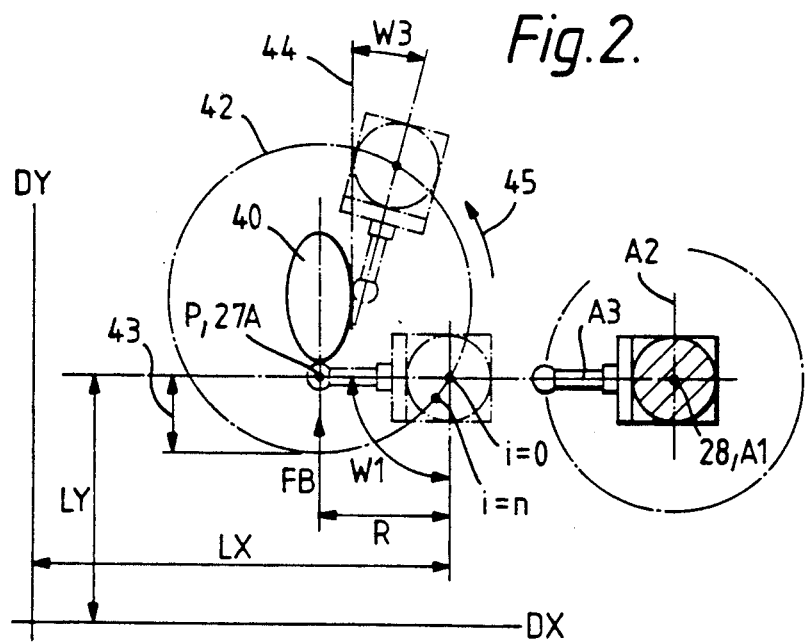
FIG. 2 is a section on the line II—II in FIG. 1.
Figure 3:
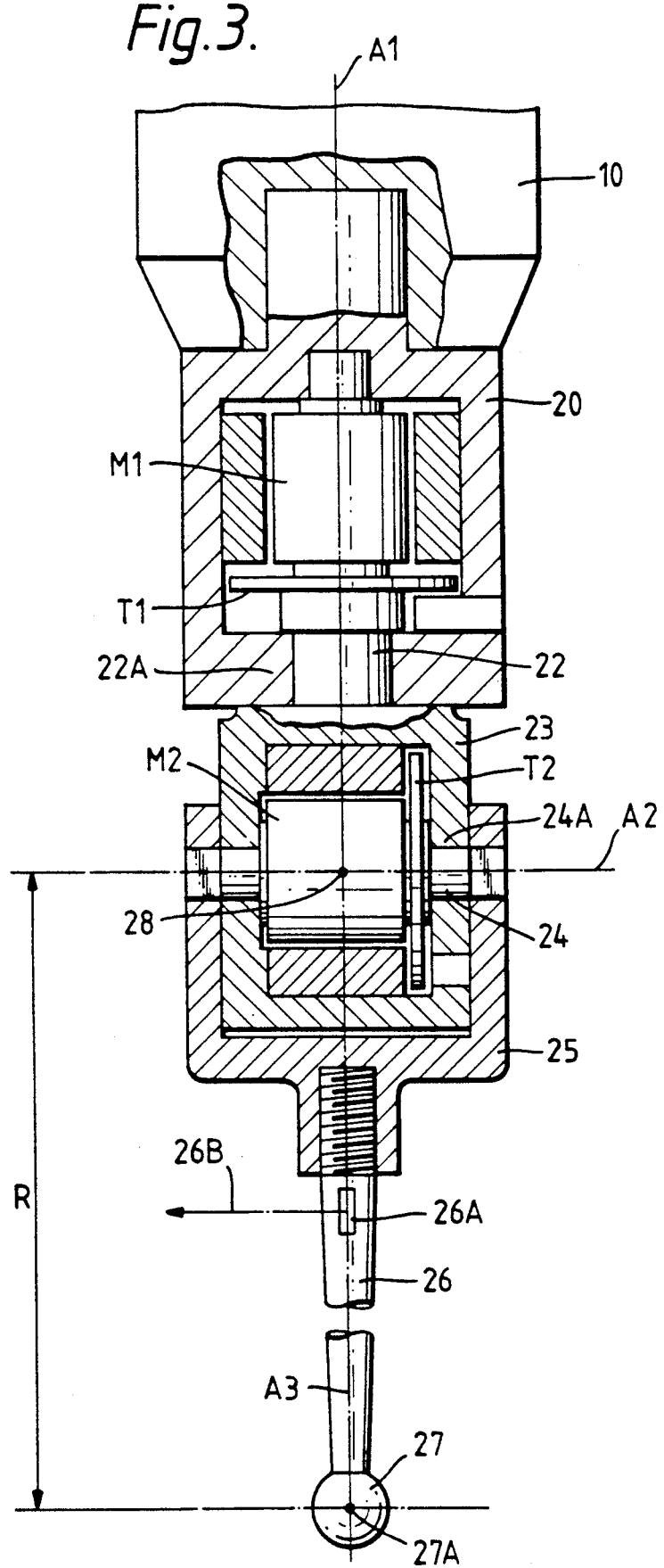
FIG. 3 is a section on the line III—III in FIG. 1 and shows details of the stylus mounting.

Referring to FIGS. 1 and 2, a co-ordinate measuring machine CMM comprises an operating member 10 supported on a table 11 for translatory movement in the three directions X,Y,Z of the orthogonal co-ordinate system. The member 10 is drivable in the directions X,Y,Z by respective motors MX,MY,MZ in a manner known per se. The operating member 10 has secured thereto a probe head PH comprising (FIG. 3) a base or housing 20 supporting a shaft 22 rotatable by a motor M1 relative to the housing 20 about an axis A1. The shaft 22 is secured to a member or further housing 23 supporting a shaft 24 rotatable by a motor M2 relative to the housing 23 about an axis A2 perpendicular to the axis A1. The shafts 22,24 are supported for rotation in respective bearings 22A,24A in the respective housings 20,23. The shaft 24 has secured thereto a frame or stylus holder 25 to which is secured a stylus 26 having an axis A3 perpendicular to the axis A2. The stylus 26 has a free end defined by a spherical sensing element 27 and a supported end defined essentially by the axis A2. The axes A1,A2,A3 preferably have a common point of intersection 28 (FIGS. 1,2).

The arrangement is such that the motors M1,M2 can position the sensing element 27 angularly about the axes A1 or A2, and the motors MX,MY,MZ can position the head PH or, more specifically, the point 28 linearly anywhere within the operating field of the machine CMM. Linear position transducers TX,TY,TZ are provided for measuring linear displacement LX,LY,LZ of the member 10 in the respective directions X,Y,Z. Angular position transducers T1,T2 are provided for measuring angular displacements W1,W2, of the stylus 26 about the respective axes A1,A2, i.e. relative to the member 10. The motors MX,MY,MZ,M1,M2 are also collectively referred to by the letter M, and the transducers are collectively referred to by the letter T.

Figure 4:
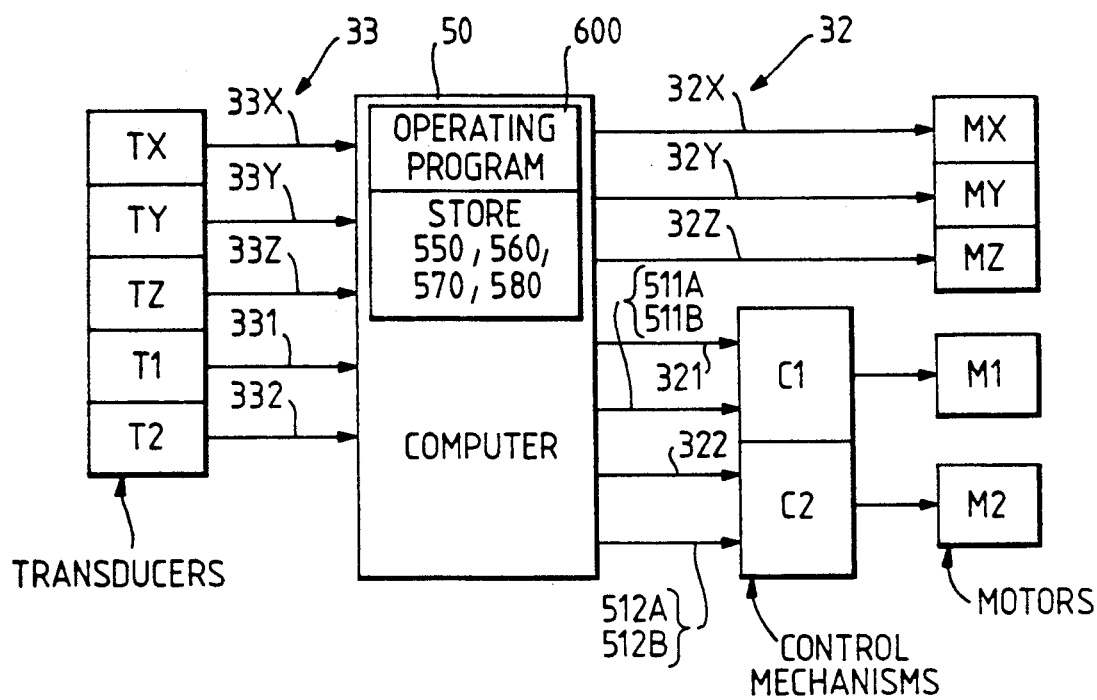
FIG. 4 is a diagram of the overall operating system of the machine shown in FIG. 1 and shows a computer, motors and feedback transducers of this system.

A computer 50 (FIG. 4) is programmed to output drive signals 32X, 32Y, 32Z, 32Z, 322, collectively denoted 32 for driving the respective motors M thereby to position the sensing element 27 relative to a workpiece 12 supported on the table 11, position feedback signals 33X, 33Y, 33Z, 331, 332, collectively denoted 33, being provided from the respective transducers T. However, the motors M1 and M2 are also adapted to be constant torque devices. In other words the motors M1,M2 are operable to move their respective armatures to a given angular position, and hold the armature in that position, or to apply to their armatures a substantially constant torque. The motors M1,M2 are operable in two modes, viz the positioning mode and the constant torque or bias mode. The arrangement is such that in the bias mode a given force FB (FIG. 2) of engagement between the sensing element 27 and the workpiece 12 can be maintained by, in this case, the motor M1. If the device PH is moved relative to the workpiece 12 in the sense of reducing the force FB, the motor M1 moves the sensing element 27 to maintain the engagement, and if the device PH is moved in the sense of increasing the force FB, the motor M1 accommodates that movement while maintaining the force FB. In other words, the stylus is pivotal about the axis A1 both in response to and in opposition to the bias torque of the motor M1.

Figure 5:
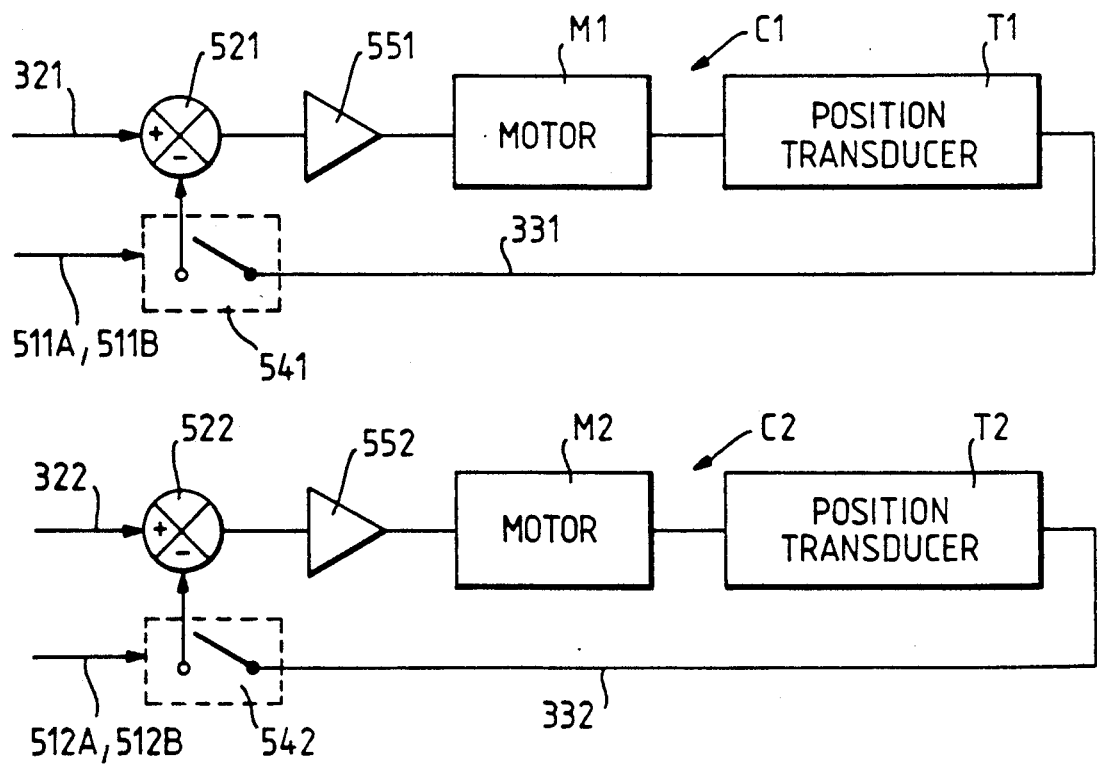
FIG. 5 is a detail of FIG. 4 and shows a diagram of control systems for motors contained in the stylus mounting.

Referring to FIG. 5, the computer 50 is arranged to control the motors M1, M2, which are DC motors, through respective control systems C1,C2 to which the drive signals 321,322 are connected as demand signals and wherein the feedback signals 331,322 are connectable to the signals 321,322 through summing junctions 521,522. This connection of the feedback signals 331,332 is effected through respective mode control switches 541,542. The computer 50 generates respective mode control signals 511A, 511B and 512A, 512B for operating the respective switches 541, 542. The arrangement is such that if either of the signals 511A, 512A is output, the respective switch 541, 542 is closed and the respective motor M1, M2 is operated in the positioning mode, but if either of the signals 511B, 512B is output the respective switch 541, 542 is opened whereby the respective motor M1, M2 is deprived of the position feedback signal 321, 322 and therefore operates in the bias mode. The systems C1,C2 have preset gain amplifiers 551, 552 for the feed forward signal so as to limit the torque of the motors to a preset value.

Figure 6A:
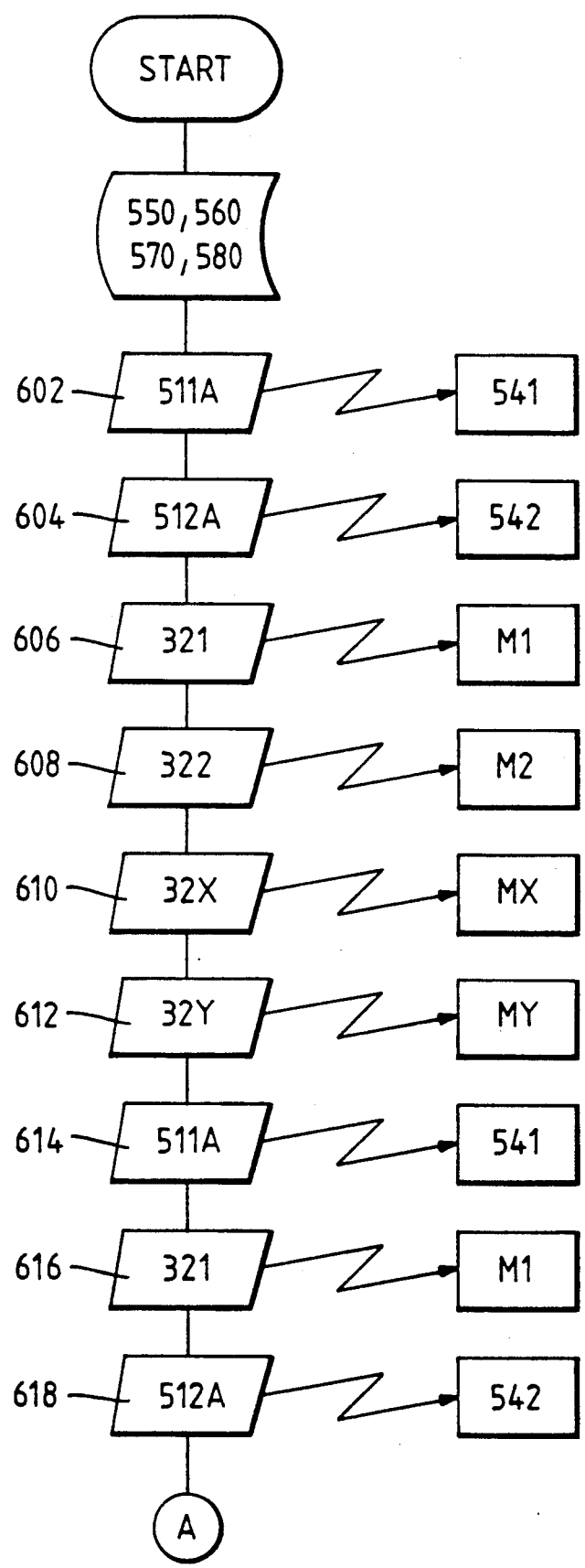
FIGS. 6a and 6b are a flow diagram for operation of the computer shown in FIG. 4.
Figure 6B:
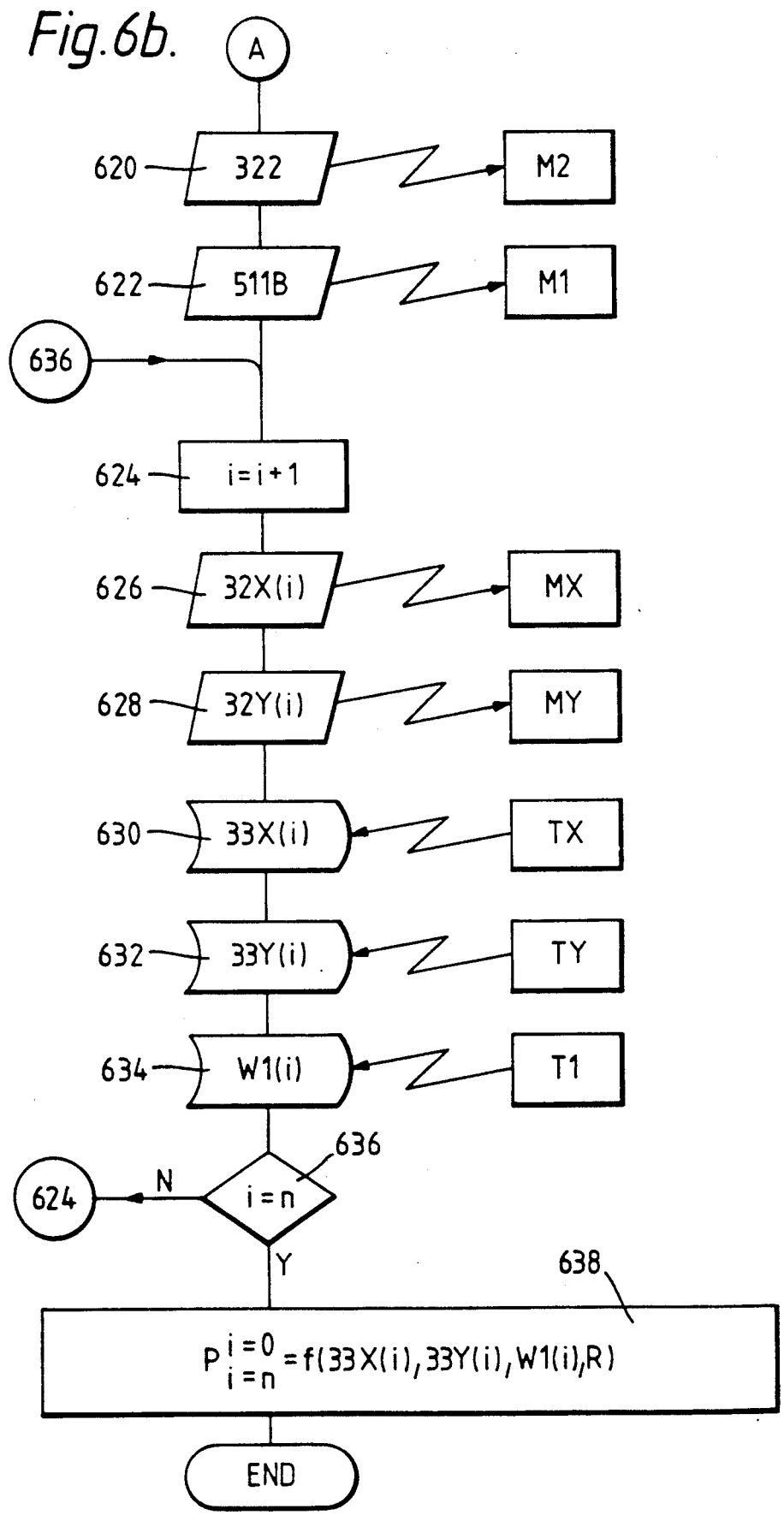

The machine CMM and the probe head PH may be used for a scanning operation to automatically determine a profile 40 of a workpiece 12 relative to a given workpiece datum DX,DY. By way of example, the profile 40 is assumed to lie in a plane 41 extending in the directions X,Y. A computer programmer determines position data 550 (FIG. 6) for a path 42 (FIG.2) which lies in the plane 41 and which is spaced from the profile 40 by a distance 43 smaller than the radial distance R between the center of the sensing element 27 and the point 28. Thus if the probe head PH is moved for the point 28 to describe the path 42, the sensing element 27 can maintain engagement with the profile 40. In the present example the workpiece 12 is a rotary cam and the path 42 is conveniently a circle surrounding the cam profile, i.e. the profile 40.

The path 42 is so pre-programmed that the axis A3 maintains an approximately constant angle W3 relative to a tangent 44 through the point of contact between the sensing element 27 and the profile. In this way the pressure between the sensing element 27 and the workpiece remains within a given tolerance and excessive variation of bending forces on the stylus 26, and consequent variations of measuring accuracy, are avoided. However, the stylus 26 may embody a means for sensing bending load thereon, e.g. a strain gauge 26A, whose output is a function of the angle W3 and which may be used to serve the motors MX,MY,MZ to positions such that the angle W3 remains substantially constant. A stylus provided with such a strain gauge and a servo system for responding to the strain gauge output are shown in our British Patent Application No. 8803847 filed 18th Feb. 1988.

The determination of position data for a path such as the path 42 is well known per se. Also known is the organization of a machine such as the machine CMM for driving an operating member through such a path. Therefore, these aspects are not specifically described other than saying that, in the present example, the data 550 comprise the orthogonal positions of the point 28 relative to a datum DX,DY at given spatial intervals between points i=o and i=n (FIG. 2) on the path 42. Further, the programmer determines position data 560 (FIG.6) being values for the signals 321, 322 whereby the stylus 26 is moved into a neutral position in which it is clear of the workpiece 12 even when the member 10 is at its starting position i=o for the scanning operation. This ensures that the member 10 can be moved into the starting position i=o without danger of collision between the stylus and the workpiece. Next, the programmer determines position data 570 (FIG.6) being values for the signals 321,322 whereby the stylus 26 is moved into a starting condition for the scanning operation, that is, the condition in which the sensing element 27 can engage the workpiece. The data 560,570 include the signals 511A,511B and 512A,512B as will become apparent later herein. The programmer also determines the radius R of the stylus. The data 550,560,570 and R are transferred into the computer store in the usual way.

Regarding the execution of the scanning operation, the point 28 is assumed, initially, to have a position in which the member 10 well clear of the workpiece. For the operation itself the computer contains a program 600 written to perform the following operations:

NOTE: Processing of data 560 (operations 602 to 608).
602: Output the signal 511A to set the switch 541 to the positioning mode.
604: Output the signal 512A to set the switch 542 to the positioning mode.
606: Output the signal 321 to move the motor M1 to predetermined neutral position.
608: Output the signal 322 to move the motor M2 to predetermined neutral position.

NOTE: Processing of data 550 (operations 610 to 612).
610: Output the signal 32X to move the member 10 to the position LX(i = 0).
612: Output the signal 32Y to move the member 10 to the position LY(i = 0).

NOTE: Processing of data 570 (operations 614 to 622).
614: Output the signal 511A to confirm the switch 541 in the positioning mode.
616: Output the signal 321 to move the motor M1 to a predetermined angle W1.
618: Output the signal 512A to confirm the switch 542 in the positioning mode.
620: Output the signal 322 to move the motor M2 to a position in which the axis A3 lies in the plane 41.
622: Output the signal 511B to put the motor M1 into the bias mode.

NOTE: Processing of data 580 (operations 624 to 634).
624: Set i = i + 1.
626: Output the signal 32X(i) to move the point 28 to the position X(i).
628: Output the signal 32Y(i) to move the point 28 to the position Y(i).
630: Read the signal 33X(i) to store.
632: Read the signal 33Y(i) to store.
634: Read the signal W1(i) to store.
636: Check whether i = n; if NO go to 624; if YES go to 638.
638: Compute the position P(i) of the points of the center 27A of the sensing element 27 relative to the datum DX,DY as a function of 33X(i), 33Y(i), W1(i) and R for all values of (i) thereby defining the profile 40.

The computation at step 638 is based on the formulae:

$$PX = LX + (R \cos W2) \cos W1 \qquad (1)$$

$$PY = LY + (R \cos W2) \sin W1 \qquad (2)$$

$$PZ = LZ + (R \cos W2) \qquad (3)$$

wherein PX,PY,PZ are the coordinates of the position P of the center 27A of the sensing element 27. In the example described formula (3) is not applicable but it is given here for the general case.

The radius of the sensing element 27 has not been taken account of because this need not be done in the case where the cam 12 is a model for copy-machining and the cutter used for the machining process has the same radius as the sensing element 27. However, the above formulae may be adapted to allow for the radius of the sensing element 27 if required.

Figure 7:
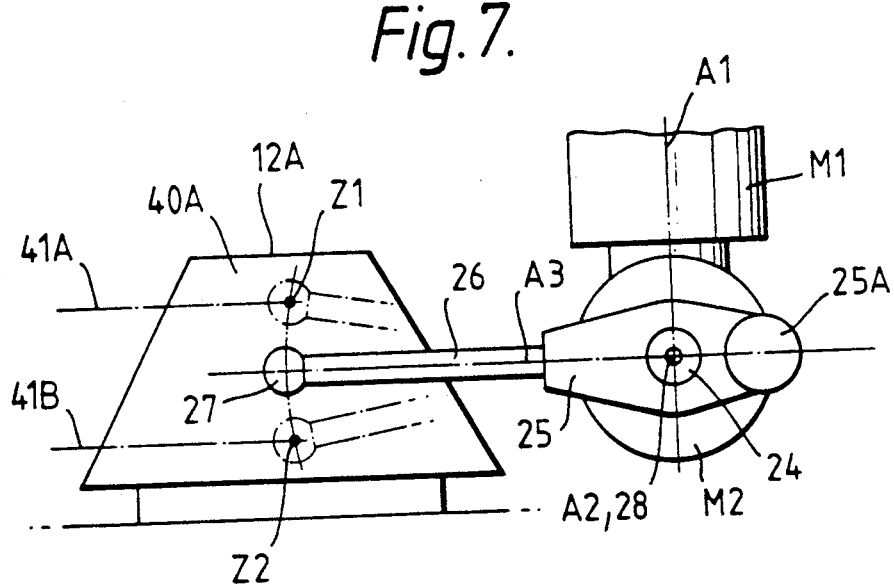
FIG. 7 is a detail of FIG. 1 and illustrates a modified mode of operating the stylus mounting.
Figure 8:
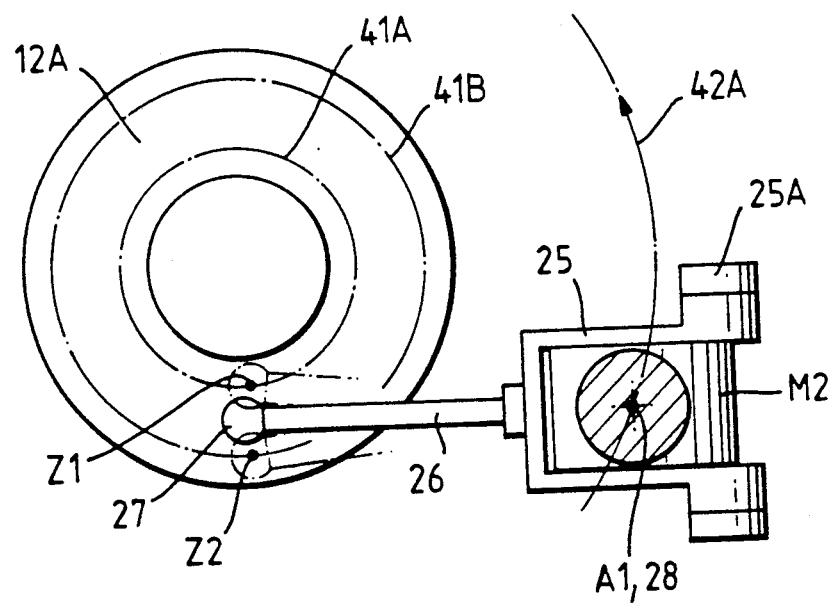
FIG. 8 is a plan view of FIG. 7.

Referring to FIGS. 7 and 8, the apparatus may be used for scanning a workpiece essentially simultaneously at several planes e.g. 41A,41B. To this end one of the motors M1,M2, in this case the motor M2, has an oscillatory motion applied thereto to drive the sensing element 27 alternately between positions Z1,Z2 while the other motor, M1, is in the bias mode. In this example the workpiece, 12A, is a cone and the positions Z1,Z2, lie at different diameters of the cone. The motors MX,MY are driven to move the point 28 through an appropriate path 42A such that the sensing element 27 can maintain contact with the cone at each plane 41A,41B. The steps 624 to 634 of the program (FIG.6) are executed each time when the sensing element 27 is at the position Z1 or Z2 so that the profile, 40A, of the cone is determined at each of the planes 14A,14B. The oscillatory motion of the motor M2 is generated by data 580 stored in the computer 50 and defining the respective positions Z1,Z2. In the program 600 the data 580 are applied to the motor M2 to move the sensing element 27 from the one position Z1,Z2 to the next, prior to the execution of the steps 624 to 634. The application of the data 580 is not illustrated in FIG. 6 but it will be readily understood that this merely requires the outputting of signals 322 of appropriate values defining the respective positions Z1,Z2 and the holding of the motor M2 in that position for the execution of one cycle of the steps 624 to 634.

The stylus 26 may be balanced by a balance mass 25A secured to the stylus holder 25 (FIGS.7,8) thereby to reduce the power requirement of the motor M2.

In a modification, not illustrated, the constant torque is applied to the stylus 26 by a motor defined by a coiled spring so that the electric motor for applying torque is not required. However, an electric motor, e.g. M1, may still be used for positioning the stylus irrespective of the force of the spring.

Figure 9:
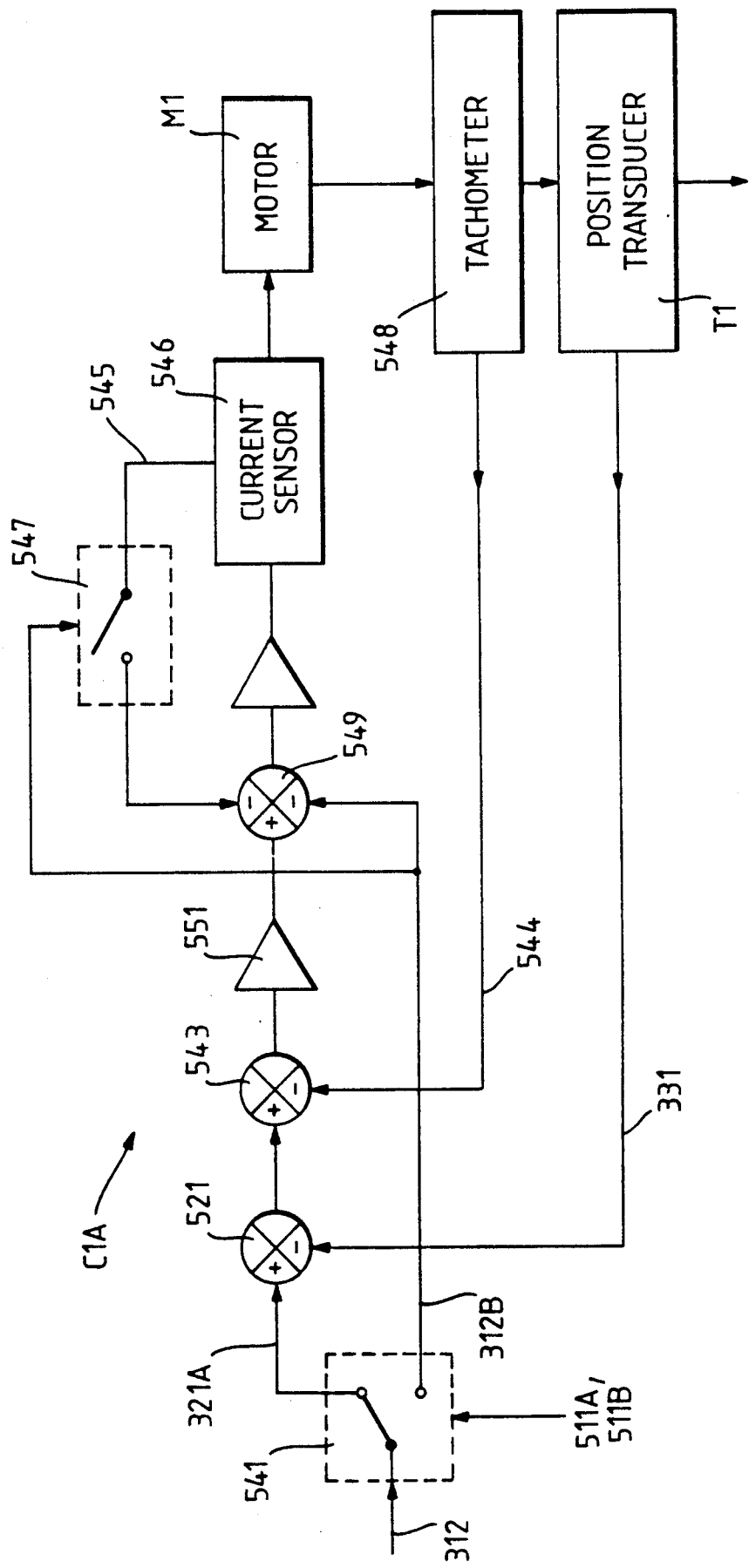
FIG. 9 shows a modification of the control systems shown in FIG. 5.

In a modification of the control systems C1,C2, FIG. 9 shows a control system C1A wherein the switch 541 is used to switch the drive signal 321 between a position demand line 321A and a maximum current demand line 321B. The line 321A is led through the summing junction 521 for the position feedback signal 331 to a summing junction 543 for a velocity feedback signal 544 from a tachometer 548 and from there to a summing junction 549 for a current feedback signal 545 from a current sensor 546. The line 321B is connected to close a switch 547 controlling the signal 545 such that the current feedback is established only if the current demand signal 321B is selected at the switch 541. In this way a constant torque can be reliably established at the motor M1. The amplifier 551 may be of relatively high gain so that, in the position control mode, a high response rate is available for the motor, the velocity of the motor M1 being limited by the signal 544. A similar control system (not shown) is of course provided for the drive signal 322.

I claim:

1. Apparatus for use on a coordinate positioning machine in measuring a surface, the machine having a head movable relative to a table on which said surface is supported, the apparatus comprising:
    a base connectable to the head;
    a first rotor supporting a surface-sensing device, the first rotor being mounted to, and for rotation relative to the base about a first axis;
    a first motor for rotating the first rotor about said first axis in response to an input signal;
    first transducing means for measuring, relative to a reference orientation, an angle of rotation of the first rotor about the first axis; and
    first controlling means for providing:
    (a) a torque input signal or operating said first motor to apply a constant torque to said first rotor; and
    b) a positioning input signal for operating said first motor to position said first rotor at a given angle of rotating relative to said reference orientation,
    wherein said first controlling means is selectively operable for passing on of said torque input signal and said positioning input signal to the motor as said input signal.

2. Apparatus according to claim 1 further comprising:
    a second rotor mounted to and for rotation with said first rotor about said first axis, and for rotation relative to said first rotor about a second axis substantially orthogonal to said first axis, wherein said surface sensing device is connected to said second rotor;
    a second motor for rotating said second rotor about said second axis in response to a second input signal;
    second transducing means for measuring, relative to a reference orientation, an angle of rotation of the second rotor about the second axis; and
    second controlling means for providing:
    a) a second torque input signal for operating said second motor to apply a constant torque to said second rotor; and
    b) a second positioning input signal for operating said second motor to position said second rotor at a given angle of rotation relative to said reference orientation,
    wherein said second controlling means is selectively operable for passing one of said second input torque signal and said second positioning input signal to the second motor as said second input signal.

3. Apparatus according to claim 2, wherein said surface sensing device is a surface sensing stylus.

4. Apparatus according to claim 3, wherein said surface sensing stylus has an axis defined by its length, and wherein said first and second axes, and the axis of said surface sensing stylus have a substantially common point of intersection.

5. A method of operating an apparatus comprising a surface-sensing stylus for mounting on a head of a coordinate positioning machine, the surface-sensing stylus being rotatable about first and second axes by means of first and second motors respectively, to contact a surface, the method comprising the steps of:
    driving the head of the machine along a path adjacent a plane of the local surface;
    applying a torque input signal to one of the first and second motors, thereby to urge the surface-sensing stylus into contact with the surface; and
    applying to the other of the first and second motors positioning input signals such that said surface-sensing stylus has an oscillatory motion transverse to the path of the head of the machine.

6. A method of scanning a surface of a workpiece with a surface sensing device, the device being supported on a head of a coordinate positioning machine by amounting device providing movement of said surface sensing device with 2 degrees of freedom relative to said head, the workpiece being supported on a table of the machine relative to which said head is movable, the method comprising the steps of:
    operating the machine to drive the head in a first direction along a path adjacent the workpiece surface;
    simultaneously operating the mounting device to move the surface sensing device into a sensing relationship with the surface, along a second direction, the second direction being transverse to said first direction and the plane of the local surface;
    simultaneously operating the mounting device to move the surface sensing device with an oscillatory motion substantially parallel to the plane of the local surface; and measuring, at predetermined intervals of time:
  a) the position of the surface sensing device relative to the head; and
  b) the position of th head relative to the table.

7. A method according to claim 6 wherein said mounting device provides movement of said surface sensing device with 2 rotational degrees of freedom.

8. A method according to claim 7 wherein said surface sensing device is a surface sensing stylus, and said sensing relationship is contact of the workpiece surface, by the surface sensing stylus.

9. A method according to claim 8 wherein said mounting device urges said surface sensing device into contact with said surface along said second direction with a substantially constant torque.

* * * * *